(12) United States Patent
Grundei et al.

(10) Patent No.: US 6,206,152 B1
(45) Date of Patent: *Mar. 27, 2001

(54) VIBRATION DAMPER WITH VARIABLE DAMPING FORCE

(75) Inventors: Manfred Grundei; Otto Samonil, both of Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/267,924

(22) Filed: Mar. 8, 1999

(30) Foreign Application Priority Data

Mar. 6, 1998 (DE) .............................................. 198 09 611

(51) Int. Cl.[7] ................................................... F16F 9/512
(52) U.S. Cl. ....................... 188/266.1; 188/281; 267/191; 280/124.16; 280/124.106
(58) Field of Search .............................. 188/266.1, 266.2, 188/280, 281, 315; 267/188–191, 223, 218; 280/124.106, 124.16, 124.107, 124.152, 124.159

(56) References Cited

U.S. PATENT DOCUMENTS

| | | | |
|---|---|---|---|
| 1,954,196 | * | 4/1934 | Breer et al. ............................ 188/37 |
| 2,718,285 | * | 9/1955 | Largay, Jr. ............................. 188/88 |
| 5,013,061 | * | 5/1991 | Fujimura et al. ..................... 280/707 |
| 5,219,414 | * | 6/1993 | Yanaoka ............................... 188/284 |
| 5,509,512 | * | 4/1996 | Grundei ................................ 188/284 |
| 5,529,153 | * | 6/1996 | Smith ................................... 188/299 |
| 5,987,366 | * | 11/1999 | Jun ........................................ 701/37 |
| 5,988,607 | * | 11/1999 | Beck ................................. 267/64.26 |
| 6,015,030 | * | 1/2000 | Grundei ............................ 188/266.2 |

FOREIGN PATENT DOCUMENTS 44 03 196   8/1994  (DE) .

* cited by examiner

Primary Examiner—Robert J. Oberleitner
Assistant Examiner—Bradley King
(74) Attorney, Agent, or Firm—Cohen, Pontani, Lieberman & Pavane

(57) ABSTRACT

A vibration damper with variable damping force, including a cylinder, in which a piston with a piston rod is arranged in axially movable fashion, whereby an adjustable damping valve is activated in dependence on the deflection distance and the activation of the adjustable damping valve is carried out via a stabilizer. The vibration damper has further damping valves, whose damping effects are independent of activation by the stabilizer. The adjustable damping valve, during equilateral deflection and rebound travel of the piston rod on a vehicle axle or unilateral rebound travel, has a damping force setting that is smaller than the damping force of the further damping valves of the vibration damper.

2 Claims, 3 Drawing Sheets

VIBRATION DAMPER WITH VARIABLE DAMPING FORCE

BACKGROUND OF THE INVENTION

1. Field of the Invention

The invention relates to a vibration damper with variable damping force.

2. Description of the Prior Art

German reference DE 44 03 196 A1 describes, in FIGS. 3a to 3c, a vibration damper with variable damping force in which the extent of the change in the damping force depends on the deflection distance. This involves a load-dependent damping force modification that only functions in connection with a spring-and-damper unit, because a vehicle suspension spring or stop buffer must act as the actuator. In compact cars, as a rule, the vibration damper is a spring-and-damper unit. However, mid-sized and large vehicles are often also equipped with vibration dampers in the form of axle dampers. In this case, the vehicle suspension spring that acts as the actuator for load-dependent damping force modification is omitted.

Alternatively, of course, an adjustable damping valve with electric activation can be used, as FIG. 5 of the aforementioned reference discloses. However, vibration dampers of this type entail considerable expense, especially with respect to ensuring reliability in the event of system failure.

SUMMARY OF THE INVENTION

The object of the present invention is to provide a vibration damper with damping force adjustment means that can be used as an axle damper and can finction independently of an energy supply.

Pursuant to this object one aspect of the present invention resides in a vibration damper having an adjustable damping valve that has, during equilateral deflection and rebound travel of the piston rod on a vehicle axle or during unilateral rebound travel, a damping force setting that is smaller than the damping force of the further damping valves of the vibration damper. This results in clearly improved comfort, compared to conventional vibration dampers, especially during equilateral deflection on an axle.

According to another embodiment of the invention, during unilateral deflection travel of the piston rod on a vehicle axle, the damping force setting of the adjustable damping valve is greater than the damping force setting of the further damping force valves. In the vibration damper, a pumping effect is created, which aligns the vehicle via the vibration damper.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
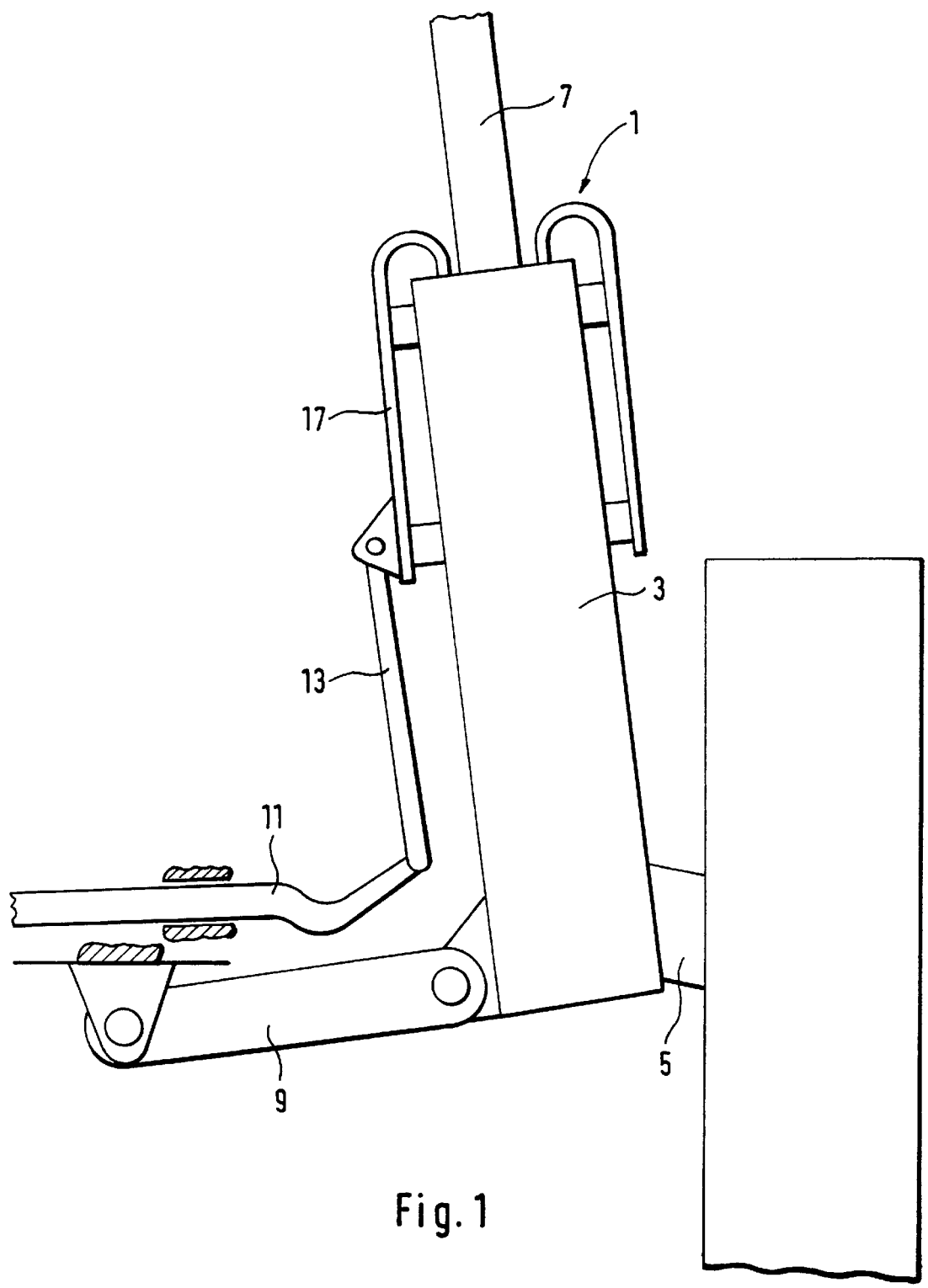
FIG. 1 shows a stabilizer-connected to the vibration damper of the present invention.

FIG. 1 shows, in highly simplified fashion, a vibration damper 1 constructed as an axle damper. A wheel carrier 5 is connected to a cylinder 3 of the vibration damper wherein a vehicle body (not shown) is supported on a piston rod 7. A vehicle axle 9 has a stabilizer 11 which alters the damping force of a damping valve 15 (FIG. 2) via a strut 13.

Figure 2:
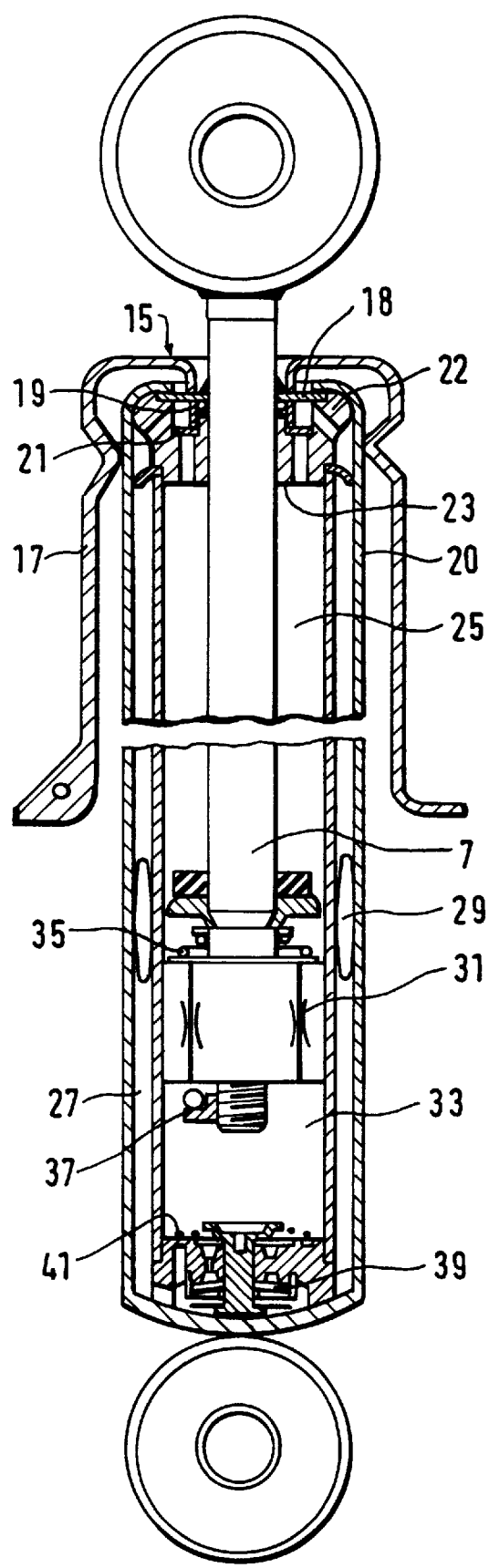
FIG. 2 shows an embodiment example of the vibration damper.

During a rolling movement of the vehicle, the strut 13 is operated by the stabilizer 11, whereby the strut 13 has an adjustment force and an adjustment distance. The adjustment force and adjustment distance are transmitted to the damping valve 15, which is shown in FIG. 2. The strut 13 acts upon a tube-like transmitting element 17 that rests on a spring disk 18. The spring disk 18 is braced on a first piston rod guide part 22 via the beaded end of a container tube 20. Parameters for the active spring force of the spring disk 18 include the ratio of the contact width on the first piston rod guide part 22 to the lever arm of the transmitting element 17 up to the clamping point of the spring disk 18.

The spring disk 18, via an intermediate sleeve 19, activates a valve plate 21 inside a second piston rod guide part 23. The height of the intermediate sleeve 19, which is arranged in an opening of the first piston rod guide part 22 and braced between the spring disk 18 and the valve plate 21, can be used as a further parameter for the transmission force of the spring disk 18. The ratio of the depth of the opening to the height of the intermediate sleeve 19 influences the prestress of the spring disk 18 independently of the activation force of the stabilizer. It is even possible to provide a certain free clearance for the valve plate 21. The second piston rod guide part 23 permits the damping medium to flow from an upper working space 25 into a compensation space 27. To prevent foaming, a gas bubble 29 is placed in the compensation space 27.

The upper working space 25 is separated from a lower working space 33 by a piston 31 on the piston rod 7. Further damping valves 35, 37 for the inward and outward travel directions are arranged inside the piston 31 and establish a connection between the working spaces 25, 33. A further damping valve 39 is arranged in the bottom of the lower working space 33 and acts when overflow into the compensation space 27 occurs. In addition, a non-return valve 41, which opens with practically no resistance when the piston rod 7 moves outward, is embodied in the bottom. The damping valves 35, 37, 39 produce a damping force independently of a rolling movement.

Based on the activation of the valve plate 21 by the stabilizer 11, two cases of damping movement must be distinguished in the inward travel direction of the piston rod 7.

Figure 3:
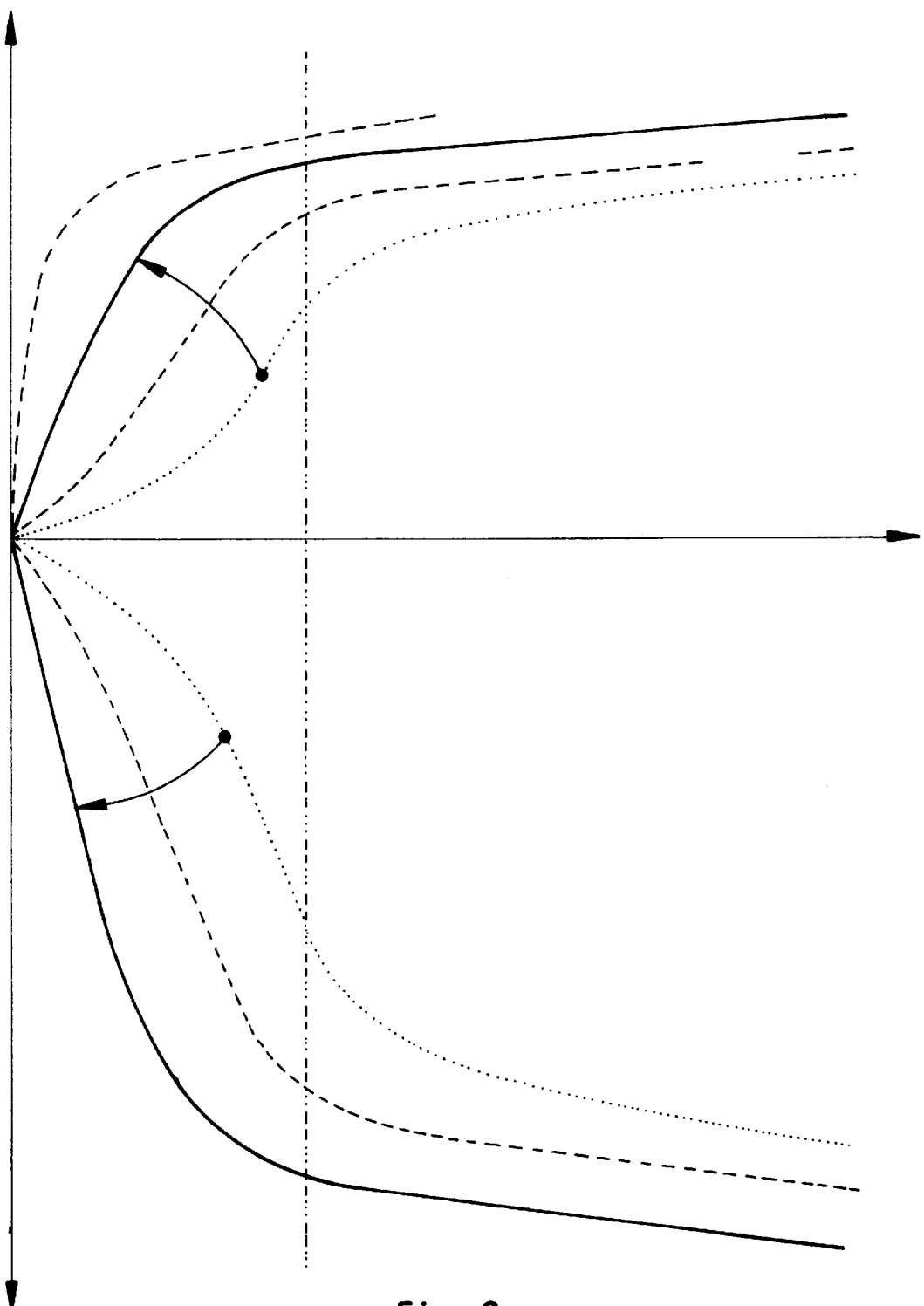
FIG. 3 shows damping force curves.

If a vehicle crosses a depression in the road, the two piston rods of the vibration damper of a vehicle axle travel inward simultaneously or almost simultaneously. The stabilizer 11 does not act as a force and distance transmission mechanism. Only the damping valves 35 and 39 exercise a damping effect. The force on the valve plate 21 is very slight, depending on a possible prestress. As a result, the damping medium flows along the path of least hydraulic resistance. Compared to conventional vibration dampers, the damping valves 35, 39 are designed, with respect to damping force, with a greater throttle effect. The flow path via the valve plate 21 is connected hydraulically parallel to the damping valves 35, 39, so that the damping valves 35, 39 are effective only when sufficiently great banking-up pressure already exists on the valve plate 21 due to a high flow speed. Overall, comfortable damping behavior is established. FIG. 3 compares the damping force curves of standard vibration dampers to those of the vibration damper according to the invention. It is clear that a considerable increase in comfort can be attained, on the one hand, while, on the other hand, it is also possible to attain greater damping work, considering the areas under the curve.

FIG. 3 shows a "pump version" that displays special behavior. When the valves for the inward travel direction are designed to have particularly large damping forces, the piston with the piston rod will rest, during unilateral deflection of the vehicle, on the restrained damping medium in the lower working space 33, because the damping medium cannot escape to a sufficient extent through either the damping valve 35 or the bottom valve 39. However, the lower working space 33 is not hydraulically tight. As a rule, vehicles do not travel on ideally flat roads. Rather, during cornering, the inward movement of the piston rod 7, due to the vehicle body inclination, has superimposed on it a spring movement due to the vibrations caused by the road.

During outward movement of the piston rod 7, the outer curve vibration damper, which rests on the restrained damping medium, forces damping medium out of the upper working space 25. The damping medium flows via the non-return valve 41 from the compensation space 27 into the lower space 33. Upon renewed inward travel of the piston rod 7, the damping medium is again enclosed in the lower working space. Thus, the piston rod 7 can travel only slightly inward, but is nonetheless located in a stroke position that is farther outward, relative to the previous inward movement. The non-return valve 41, together with the damping valves 35 and 39, form a pump device, which pushes the piston rod 7 successively outward without the use of outside energy and thus aligns the vehicle during cornering.

The inner curve wheel thereby rebounds. The stabilizer 11 cannot exercise any force on the valve plate 21. During rebound travel, the piston 31 can displace the contents of the upper working space 25, whereupon damping medium can flow from the compensation space 27 via the non-return valve into the lower working space 33. The wheel thereby maintains sufficient contact with the road. At the same time, the pumping work of the vibration damper on the outer curve wheel is not opposed. The stabilizer 11 exercises no significant force on the valve plate 21 of the inner curve wheel vibration damper, even during an alignment movement of the vehicle body.

The invention is not limited by the embodiments described above which are presented as examples only but can be modified in various ways within the scope of protection defined by the appended patent claims.

We claim:

1. A vibration damper with variable damping force, comprising:

a cylinder;

a piston and a piston rod arranged in the cylinder so as to be axially movable;

an adjusting damping valve connected between the cylinder and the piston rod, and controlled as a function of a spring deflection path;

a stabilizer operatively connected to the adjustable damping valve so as to control the adjustable damping valve; and additional damping valves arranged to have a damping effect independent from the control by the stabilizer, the adjustable and additional damping valves being constructed so that the adjustable damping valve has a damping force setting that is smaller than a damping force of the additional damping valves one of during equilateral deflection and rebound travel of the piston rod on a vehicle axle and during unilateral rebound travel, relative to a further damper on the axle.

2. A vibration damper as defined in claim 1, wherein the adjustable damping valve is configured so that the damping force setting at the adjustable damping valve is greater than the damping force setting of the further damping force valves during unilateral deflection travel of the piston rod.

* * * * *